United States Patent

[11] 3,632,896

[72] Inventor Itsuki Ban
829 Higashi-Oizumimachi, Nerima-ku,
Tokyo-to, Japan

[21] Appl. No. 866,349
[22] Filed Oct. 14, 1969
[45] Patented Jan. 4, 1972
[32] Priority Oct. 15, 1968
[33] Japan
[31] 43/89356

[54] ENDLESS MAGNETIC TAPE PLAYING TIME INDICATING APPARATUS
4 Claims, 2 Drawing Figs.

[52] U.S. Cl. .................................................... 179/100.2 B, 274/4 R
[51] Int. Cl. ........................................................ G11b 27/14
[50] Field of Search ............................................ 179/100.2 R, 100.2 A, 100.2 MD, 100.2 B; 274/2, 4 R, 4 A, 4 C, 4 G, 4; 33/127; 116/115; 235/104

[56] References Cited

UNITED STATES PATENTS

| | | | |
|---|---|---|---|
| 3,060,278 | 10/1962 | Parris ........................... | 179/100.2 |
| 3,414,269 | 12/1968 | Appel ........................... | 274/4 |
| 3,434,725 | 3/1969 | Eibensteiner ................. | 274/4 |

*Primary Examiner*—Maynard R. Wilbur
*Assistant Examiner*—Leo H. Boudreau
*Attorney*—Jacobs & Jacobs

ABSTRACT: An endless magnetic tape playing time indicating apparatus for an endless magnetic tape player is provided with pointer means rectilinearly moved by rotatable force of a rotary drive capstan for driving the tape, and indicator means including scale means corresponding to the pointer means. Provided between the pointer means and the rotary capstan are a speed reducing device decelerating rotation of the capstan, drum means rotatably driven through the speed reducing device by the capstan, and a flexible stringy member taken up by the drum means with rotation of the capstan, the pointer means being rectilinearly moved when the flexible stringy member is wound on the drum means. The flexible stringy member is drawn from the drum means whenever the magnetic tape completes one cycle to thus return the pointer means to its starting position.

PATENTED JAN 4 1972 3,632,896

ENDLESS MAGNETIC TAPE PLAYING TIME INDICATING APPARATUS

BACKGROUND OF THE INVENTION

The present invention relates to an endless magnetic tape playing time indicating apparatus for an endless magnetic tape player.

The endless magnetic tape contained in the cartridge conventionally provides a plurality of record tracks and may be generally played by the endless magnetic tape player upon successively change over of the track whenever the tape completes one cycle. The changing of the track to be played is, in general, effected by a shifting mechanism which allows the magnetic head to scan step-by-step in relation across the tracks. In view of the nature of the endless magnetic tape, the tape is cyclically and continuously driven so that there is a disadvantage that portion of the tape being played is not easily identified. It is apparent that this can be eliminated by identifying the tape length thus knowing where the tape in the play is indirectly. However, disadvantage derived from the use of the conventional counter to count the tape length is in the following. That is, the endless magnetic tape is cyclically driven so that the counter continues its actuation even after one cycle, for instance, if the magnetic tape makes three cycles, the tape length played is counted for the three cycles in the aggregate. For this reason, it is impossible to know the position of the tape that has been played. In view thereof, in order to know the endless magnetic tape playing position, it is required for a provision by which indication of the tape length on playing time is made at the beginning whenever the tape completes one cycle. In other words, an arrangement should be such that the playing time may be independently countered at each track.

SUMMARY OF THE INVENTION

It is a primary object of the present invention to provide an endless magnetic tape indicating apparatus for an endless magnetic tape player, which is capable of indicating the endless magnetic tape playing time at each cycle of the tape.

Another object of the invention is to provide an endless magnetic tape indicating apparatus for an endless magnetic tape player, which is capable of indicating the tape playing time by providing indicator means including pointer means rectilinearly moved by the means for driving the tape, and scale means having divisions corresponding to the tape playing time.

A further object of the invention is to provide an endless magnetic tape indicating apparatus for an endless magnetic tape player, wherein pointer means is fixed to a flexible stringy member taken up by drum means rotatably driven through a speed reducing device by the capstan, the pointer means being rectilinearly moved when the flexible stringy member is wound on the drum means.

Still further object of the invention is to provide an endless magnetic tape driving volume indicating apparatus for an endless magnetic tape player wherein power transmission between the capstan and the drum means is disconnected in response to the fact that a contactor sensing a conductive patch on the tape senses the conductive patch and at the same time the flexible stringy member is drawn from the drum means, and the pointer means is returned to its starting position to point out a starting division of the scale means.

Other objects and advantages will become apparent from the following description of the exemplary embodiment of the invention illustrated in the drawings, in which:

DESCRIPTION OF THE PREFERRED EMBODIMENT

Figure 1:
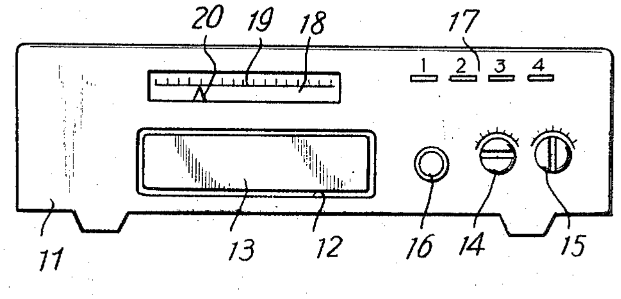
FIG. 1 is a plan view of an endless magnetic tape player incorporating an endless magnetic tape driving volume indicating apparatus according to the present invention.

Referring now to the drawings, where like reference characters designate like or corresponding parts throughout the several views, an endless magnetic tape player which is provided with magnetic tape indicating apparatus according to the present invention includes a player cabinet 11 having slot or tunnel opening 12 into which an endless magnetic tape cartridge 13 is readily inserted for play. Control knob sets 14, 15 are used to operate the tape player, and for volume and stereo balance settings. Track or channel selection knob 16 is provided to allow the channel to be changed and each time it is depressed and released a new track or channel will be selected. A track or channel indicator 17 is to show the selected track or channel when the knob 16 is pushed. As thus incorporated in this player, the indicator 17 includes pilot elements which correspond to four channels and are capable of selectively lighting. An indicator for the magnetic tape playing time indicating apparatus is provided above the slot opening 12. The indicator therefor comprises an elongated scale plate 18 of transparent plastic or glass on which are divisions 19, and a pointer 20 which is visible through the scale plate 18, and the detail of which will be described later. The pointer 20 is caused to be moved along the divisions 19 in response to the transport or running of the magnetic tape and thus the actual playing time could be identified by reading the division pointed out by the pointer 20.

Figure 2:
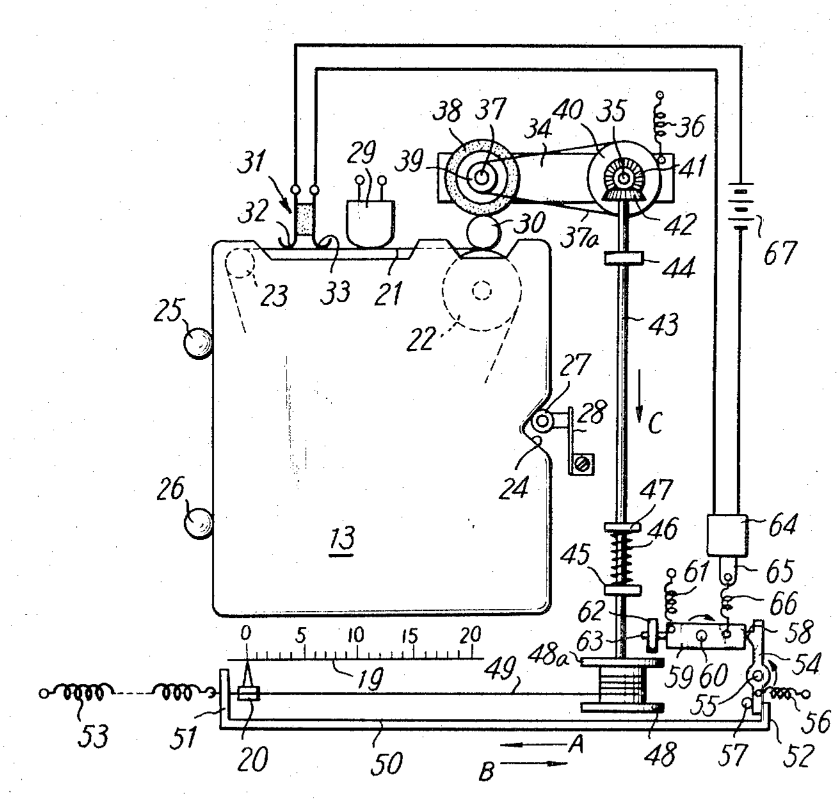
FIG. 2 is a schematic diagram illustrating the endless magnetic tape driving volume indicating apparatus.

FIG. 2 is a representation to illustrate the magnetic tape driving indicating apparatus of the present invention incorporated in the cabinet 11 and the arrangement of the parts as shown is schematic rather than the actual design, for the purpose of better understanding. The tape cartridge 13 includes a generally rectangular housing with a centrally disposed reel assembly (not shown) on which an endless magnetic tape 21 is wound and unwound in conventional manner. The endless tape 21 passes over a pinch roller 22 and guide 23. The pinch roller 22 and guide 23 are disposed adjacent the leading edge of the cartridge whereat the cartridge sidewall is cut away or dispensed with and the endless tape 21 is extended from the center of the hub of the reel (not shown) about the guide 23 and thence about the pinch roller 22 back to the outer periphery of a roll formed by the tape wound about the hub. Insertion of the cartridge 13 into the slot 12 (FIG. 1) in the player results in that the cartridge is mounted on a horizontal deck (not shown) in the cabinet 11 by means of guides 25, 26 and a retention guide 27 provided on the deck as shown in the drawing. The retention guide 27 is provided by a leaf spring 28 on the deck and is pressed by bias of the leaf spring 28 into a notch 24 on the sidewall of the cartridge 13. The cartridge 13 is urged in the forward direction by the force of the retention guide 27 which abuts against the inclined wall of the notch 24 thereby establishing play action of the endless tape 21 with a magnetic head 29 and a capstan 30. The capstan 30 may be driven by a motor (not shown), and is rotated at a preset constant speed to transport the magnetic tape 21 at its predetermined linear playing speed. The capstan 30 firmly presses the tape 21 against the pinch roller 22 in its drive relation. The contactor 31 contains two feeler contacts 32, 33 that ride on the endless magnetic tape 21. The feeler contacts 32, 33 are electrically separated and are shorted by a conductive patch or end mark (not shown) secured to the track end/start position on the tape.

Supported freely swingable around a rotatably provided shaft 35, via a bearing (not shown), extending upwardly from the deck is a swing lever 34 which is urged in the counterclockwise direction by a tension spring 36. A rubber covered frictional wheel 38 is rotatably mounted on a shaft 37 provided on the swing lever 34 and engaged with the capstan 30 by bias of the tension spring 36 and thus rotatably driven by the capstan 30. A pulley 39 which is fixed to the frictional wheel 38 and rotatable therewith, is supported with the frictional wheel 38 by the shaft 37. A belt 37*a* is trained between a small pulley 39 and larger pulley 40 on the shaft 35 and rotation of the frictional wheel 38 is transmitted through the pulley 39, belt 37*a* and the pulley 40 to the shaft 35 on which a bevel gear 41 is rigidly mounted. The bevel gear 41 meshes with a bevel gear 42 secured to an elongated shaft 43 at one end thereof which is rotatably and slidably supported by guides 44, 45 firmly mounted on the deck. The elongated shaft 43 is urged by a compressive spring 46 provided between a coller 47 fixed to the shaft 43 and the guide 45 to cause the bevel gear 42 to engage the bevel gear 41. A rotary drum 48 is rigidly mounted on the elongated shaft 43 at the other end thereof to reel up a flexible stringy member 49 such as nylon thread. One end of the flexible stringy member 49 is tightened to a bent portion 51 of a slide lever 50 longitudinally and slidably supported by a guide (not shown). The pointer 20 is fixed to a portion of the flexible stringy member 49 and is moved along the division 19 in the rightward direction when the stringy member 49 is taken up by the drum 48. The slide lever 50 is urged in the direction of the arrow of A by means of a tension spring 53. This movement of the lever 50 in the direction of the arrow A is blocked when the other bent portion 52 of the slide lever engages a lever 54. The lever 54 is pivoted to a pivot 55 and given counterclockwise rotation force by means of a spring 56. When the bent portion 52 of the slide lever 50 engages the lever 54, the latter is rotated in the clockwise direction against bias of the tension spring 53. This rotation of the lever 54 is prevented by a stopper pin. A swing member 59 is pivoted to a pivot 60 and given clockwise direction force by means of a spring 61. Rotatably mounted on a shaft 63 secured to the swing member 59 at one end thereof is an idler wheel 62 which abuts against a flange 48*a* of the rotary drum 48 when the swing member 59 is moved, as will be fully described later, in the counterclockwise direction. The other end of the swing lever 59 is connected through a spring 66 to a plunger 65 of a solenoid 64 and adapted to be rotated in the counterclockwise direction by the solenoid 64 when energized. A detent pawl 58 which is formed of the lever 54 and one end of which normally abuts against the swing lever 59 at the other end thereof, may be engaged by the one corner of the lever 54 when the swing lever 59 is rotated in the counterclockwise direction by the solenoid 64. Upon deenergization of the solenoid 64, the wing lever 59 is attempted to be rotated in the clockwise direction by the spring 61, however, this rotatable movement of the swing lever 59 is blocked by the detent pawl 58 of the lever 54. The solenoid 64 is energized where the feeler contacts 32, 33 are shorted by the conductive patch (not shown) provided on the magnetic tape 21.

Next, the mode of operation as to the apparatus shown in FIG. 2 will be explained hereinafter.

Rotation of the capstan 30 is decelerated and imparted through the frictional wheel 38, pulley 39, pulley 40, bevel gear 41, and the bevel gear 42 to the elongated shaft 43 thereby rotating the rotary drum 48. As the rotary drum 48 is rotated, the flexible stringy member 49 is reeled up by the rotary drum 48 to move the pointer 20 in the rightward direction and to allow the slide lever 50 to be moved in the direction of the arrow B against elastic force of the tension spring 53. In this instance, numerals "0," "5," "10," "15," "20" are used as indicia to show the position of the magnetic tape 21 identified by time interval, for example, assuming that the pointer 20 is located to point out an indicia "5" of the division 19, this means that the magnetic tape 21 is driven for 5 minutes.

When the play of one track on the tape 21 is completed and the feeler contacts 32, 33 of the contactor 31 are shorted by the conductive patch (not shown) on the tape 21, the solenoid 64 is energized from the source 67 to allow the swing lever 59 to be rotated against bias of the spring 61. When the conductive patch (not shown) moves away from the contactor 31, the solenoid 64 is deenergized while return of the swing member 59 under influence of the spring 61 is prevented by the detent pawl 58. During the swing member 59 being prevented from its returning by the spring 61, the idler wheel 62 abuts against the flange 48*a* of the rotary drum 48 and due to this abutment force the elongated shaft 43 is slid in the direction of the arrow C against bias of the spring 46 whereby the bevel gear 42 is released from mesh with the bevel gear 41. As a result, rotation of the elongated shaft 43 depending on the capstan 30 is blocked and at the same time the slide lever 50 is movably returned in the direction of the arrow A by bias of the tension spring 53. With this return movement of the slide lever 50, the stringy member 49 is drawn from the rotary drum 48 and the elongated shaft 43 is free to be rotated. When the rotary drum 48 is free to be rotated, this rotation of the rotary drum 48 is not interfered with by the idler wheel 62 since the idler wheel 62 which abuts against the flange 48*a* is able to rotate. By movement of the swing lever 50 in the direction of the arrow A, the bent portion 52 engages the lever 54 and thereby rotates the lever 54 in the clockwise direction against bias of the spring 56 and finally abuts against the stopper pin 57 to complete the restoration of the lever 54 to the position shown in FIG. 2, i.e., its starting position. On the other hand, the detent pawl 58 of the lever 54 is disengaged from the one corner of the swing member 59 so that the latter is rotatably restored in the clockwise direction by bias of the spring 61. With restoration of the swing member 59, the idler wheel 62 is away from the flange 48*a* of the rotary drum 48 whereby the elongated shaft 43 is slid by bias of the spring 46 to a position where the bevel gear 42 meshes with the bevel gear 41. Accordingly, the elongated shaft 43 is rotatably driven by the capstan 30 to allow the rotary drum 48 to take up the flexible stringy member 49 thereon. When the slide lever 50 is in engagement with the lever 54, the pointer 20 is returned to such a position it points out the indicia "0" of the division 19, and upon rotation of capstan 30, the stringy member 49 is again taken up by the rotary drum 48 so that the pointer 20 again initiates its movement away from the zero position.

Assuming that the feeler contacts 32, 33 of the contactor 31 are shorted by the conductive patch (not shown) on the magnetic tape 21, a track changing mechanism (not shown as it does not form a part of the invention) is actuated to effect changeover of the track to be played. Consequently, when the track to be played is changed over, the pointer 20 is automatically returned to where it points out the indicia "0" of the division 19.

It will be readily understood from the foregoing description that upon reading the division 19 pointed out by the pointer 20, the position of the magnetic tape 19 could be identified thereby at each track.

In the illustrated embodiment, the division 19 is in the form of the indicia corresponding to the time interval in which the magnetic tape is driven, however, the division may be in the form of the indicia showing the length of played on recorded.

The invention and its attendant advantages will be understood from the description hereinbefore. It is to be understood that changes and variations may be made without departing from the spirit and scope of the invention as defined in the appended claims.

What is claimed is:

1. An endless magnetic tape playing time indicating apparatus for an endless magnetic tape player having tape drive means including a rotary drive capstan for driving tape, and an electrical circuit incorporating a magnetic head, said player using tape having a conductive patch, comprising:

indicator means having rotatable drum means, pointer means and scale means, said pointer means being normally at a predetermined initial position and being fixed to a flexible stringy member, said scale means having divisions related to the tape playing time, said flexible stringy member being connected at one end thereof to said drum means and connected at the other end thereof to spring means, said spring means being arranged to unreel said flexible stringy member from said drum means and move the pointer means to said initial position and to maintain said flexible stringy member in rectilinear condition when said stringy member is wound on to or unwound from said drum means; transmission means for imparting rotatable force of said tape drive means to said drum means and for rotating said drum means in a direction for reeling up said flexible stringy member on said drum means against the bias of said spring means, said pointer means being rectilinearly moved along said scale means when said flexible stringy member is reeled up on said drum means, said transmission means having a reduction ratio such that said pointer means with said flexible stringy member is not wound into said drum means; said transmission means including a frictional wheel adapted to abut against said capstan and to be rotatably driven thereby, a first gear, means for imparting rotatable force of said frictional wheel to said first gear, a second gear meshing with said first gear, a rotatable and axially slidable shaft, said second gear being secured to said shaft, said drum means being fixed to said shaft, and bias means urging said shaft to allow said second gear to mesh with said first gear; control means for sensing said conductive patch and for controlling power transmission of said transmission means, said control means being responsive to the conductive patch on the tape to disconnect power transmission of said transmission means when said conductive patch is sensed, whereby said flexible stringy member is drawn from said drum means by the bias of said spring means; said control means including a contactor having a pair of electrically separated feeler contacts adapted to be shorted by said conductive patch on the tape, a solenoid adapted to be energized when said feeler contacts are shorted by said conductive patch, a plunger for said solenoid, a pivotally movable swing member connected to said plunger, said swing member being adapted to be swung from a normal first position to a second position by said plunger when said solenoid is energized, said swing member being arranged to slide said shaft against the bias of said bias means in moving from said first position to said second position, said first and second gears being unmeshed when said swing member has moved to said second position, and retaining means to retain said swing member in said second position; and stop means operable when the pointer means is returned to the initial position for stopping the unreeling of said stringy member by said spring means and for releasing said retaining means to permit said first and second gears to mesh under the action of said bias means.

2. An endless magnetic tape indicating apparatus for an endless magnetic tape player in accordance with claim 1, wherein said swing member includes a rotatable idler wheel, said idler wheel being swung with said swing member and being adapted to abut against said drum means when said swing member is in said second position, whereby due to said abutment force said shaft is slid against the bias of said bias means.

3. An endless magnetic tape indicating apparatus for an endless magnetic player in accordance with claim 1, wherein said retaining means is a lever means and said stop means has a longitudinally and slidably movable slide lever, one portion of said slide lever is connected to said flexible stringy member, and the other portion of said slide lever is adapted to engage said lever means when said pointer means is returned to the initial position for releasing the retention of said swing member by said retaining means.

4. An endless magnetic tape indicating apparatus for an endless magnetic player in accordance with claim 1 wherein said scale means includes a transparent scale plate mounted on the front of the player cabinet and being provided with said divisions, said pointer means being visible through said scale plate.

* * * * *